United States Patent [19]

Arnold et al.

[11] Patent Number: 4,464,218

[45] Date of Patent: Aug. 7, 1984

[54] METHOD FOR REINFORCING NET MATERIALS

[75] Inventors: Harmon W. Arnold; Galen B. Erwin, both of Carthage; John P. Gowing, Joplin; David D. Mundell, Carthage, all of Mo.

[73] Assignee: Flex-O-Lators, Inc., Carthage, Mo.

[21] Appl. No.: 485,870

[22] Filed: Apr. 18, 1983

[51] Int. Cl.³ .............................................. B29D 3/02
[52] U.S. Cl. ........................... 156/244.12; 156/244.15; 156/244.25; 156/296
[58] Field of Search ............... 156/166, 167, 176, 177, 156/178, 244.11, 244.12, 244.15, 244.25, 324, 296, 180, 181; 425/113; 264/174; 428/255, 256, 247, 292, 293, 294

[56] References Cited

U.S. PATENT DOCUMENTS

| | | | |
|---|---|---|---|
| 2,545,981 | 3/1951 | Warp | 156/244.25 X |
| 2,760,229 | 8/1956 | Cheney et al. | 425/113 X |
| 3,034,941 | 5/1962 | Hessenthaler et al. | 154/46 |
| 3,222,237 | 12/1965 | McKelvy | 156/177 |
| 3,499,816 | 3/1970 | Areskoug | 156/436 |
| 3,622,429 | 11/1971 | Kippan | 161/60 |
| 3,674,583 | 7/1972 | Allport | 156/244.25 |
| 3,713,924 | 1/1973 | Fairbanks | 156/167 |
| 3,773,590 | 11/1973 | Morgan | 156/244.27 |
| 3,802,985 | 4/1974 | Leatherman | 156/244.25 |
| 4,304,622 | 12/1981 | Krumm | 156/500 |

Primary Examiner—Caleb Weston
Attorney, Agent, or Firm—John A. Hamilton

[57] ABSTRACT

A method of reinforcing netted materials composed of spaced apart strands consisting of extruding a pair of plastic strands, either or both of which may include a steel core wire, respectively at opposite sides of a sheet of the net material, and fusing the strands together intermediate the strands of the net sheet while the former are still in a highly plastic, nearly molten condition, immediately after their extrusion.

4 Claims, 6 Drawing Figures

METHOD FOR REINFORCING NET MATERIALS

This invention relates to new and useful improvements in methods for forming reinforced fabrics, and has particular reference to a method for applying reinforcing wires to otherwise relatively flimsy sheet materials of netted material.

It is desirable under many different circumstances to be able to apply reinforcing strands, either of a relatively tough material or even steel wires, to relatively flimsy netted materials. The particular product for the production of which the present method has been conceived constitutes a narrow strip, perhaps three inches wide, of a netted sheet formed of plastic strands, adapted to be molded into a foam seating cushion, usually along the base of a trench formed in the foam, and to which a cover sheet applied over the cushion, and drawn into the trench, may be securely attached, as by clips or "hog rings". Such strips are also often formed of wire netting. To strengthen and stiffen the netting strips, and also to provide a continuous, strong member to which the cover sheet may conveniently be attached, it is desirable to secure a stiffening strand to the netting, usually along the midline thereof, the netting providing secure bonding in the foam, and the stiffening strand providing secure anchorage for the cover sheet. However, the production of this product represents only one possible usage of the present method, and it will be readily apparent that the method has general applicability whenever reinforcement of netted materials is desired.

One method of applying a stiffening strand to a net sheet already in common use but applicable only when the netting is formed of wires, involves the use of a reinforcing strand consisting either of plastic or a plastic covered wire, with the cross wires of the sheet being pierced longitudinally of themselves, through the plastic of the stiffening strand, missing the wire of the stiffening strand if such a wire is used. However, economy considerations increasingly dictate the use of plastic sheet material, and the relatively very flimsy strands of the plastic netting cannot be pierced through the plastic of the stiffening strand.

Accordingly, the primary object of the present invention is the provision of a method which overcomes this difficulty, and which consists generally of extruding the plastic stiffening strand, either with or without a wire core, and then, while the plastic is still in a hot, semi-molten condition, embedding the cross strands of the plastic netting therein.

One method accomplishing this object is simply to press the reinforcing strand, while its plastic material is still hot and semi-molten, firmly against the plastic netting, so that the strands of the latter are laterally impressed bodily into the former. The plastic of the reinforcing strand may be selected to have a lower melting point than the plastic of the netting, in order to avoid melting of or other heat damage to the netting. This method, though within the purview of the present invention, is not preferred and is not illustrated in the drawing, no drawing being believed necessary. It is not preferred since when one plastic is nearly molten and the other solid, no effective bond is formed therebetween, and since the stiffening strand plastic does not completely surround and enclose the netting strands. Therefore the ultimate connection of the strands is somewhat insecure.

The preferred method consists of entruding the stiffening strand in the form of two separate longitudinal elements, either one of which, or both, my include a wire, introducing the netting sheet between these elements, and pressing the elements together, with the netting therebetween, while still in their semi-molten condition, so that they fuse together between the cross strands of the netting to form a unitary strand. Thus each netting cross strand is completely surrounded and encircled by the plastic of the stiffening strand, and the connection therebetween is quite secure, limited only by the strength of the materials used.

Other objects are the provision of a method of the character described which is efficient and economical, and which is well adapted for performance by automatic machinery providing continuous production.

With these objects in view, as well as other objects which will appear in the course of the specification, reference will be had to the accompanying drawing, wherein.

Figure 4:
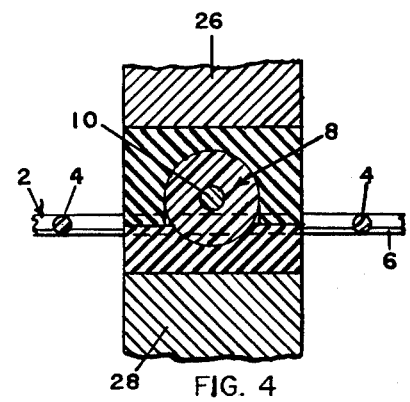
FIG. 4 is an enlarged, fragmentary sectional view taken on line IV—IV of FIG. 1.
Figure 5:
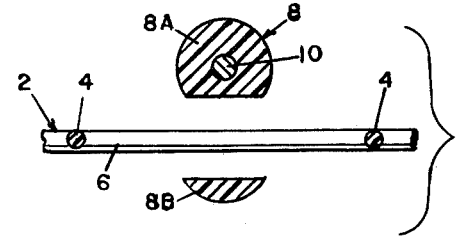
FIG. 5 is an enlarged, fragmentary sectional view of the netting material to be reinforced, together with the elements of the reinforcing strand shown prior to fusing thereof.
Figure 3:
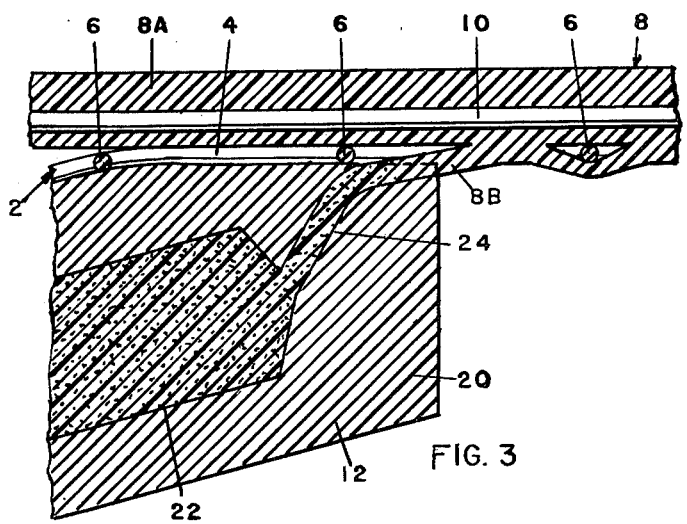
FIG. 3 is a greatly enlarged fragmentary view similar to FIG. 1.
Figure 6:
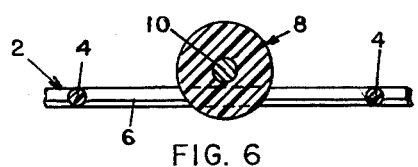
FIG. 6 is a view similar to FIG. 5, but with the structure completed by fusion of the stiffening strand elements.

Like reference numerals apply to similar parts throughout the several views, and referring first to FIG. 5, it will be understood that the netting sheet 2 to be reinforced constitutes an open network of plastic strands, including longitudinal strands 4 and cross strands 6. It may be of any desired width. As shown, the longitudinal and cross strands are press-bonded together at their points of intersection, so as all to lie in the same plane. FIG. 4 also shows the reinforcing strand designated generally by the numeral 8, which is initially divided longitudinally into two unequal segments 8A and 8B. They are so configurated that when joined at their flat sides, they form a strand having a circular cross-sectional form. At least one of the segments, usually the larger one, or 8A, may have an oil-tempered steel core wire 10 extending longitudinally therethrough, preferably axially centered with respect to the circular form. Or the segments could be semi-circular and equal, and each could have a wire 10 molded therein. In accordance with the present method, the two segments 8A and 8B are formed of plastic material such as a high density polyethylene, and are extruded, through separate dies in a single extruder, then disposed at the respectively opposite side of netting sheet 2 between a pair of the longitudinal strands 4 of said sheet, as indicated in FIG. 4, and finally are pressed together, with sheet 2 sandwiched therebetween, and while they are still in a hot, semi-molten condition, so that they fuse together in the spaces between cross strands 6 of the netting sheet. The segments 8A and 8B then form a single, unitary strand 8, completely surrounding and encircling said cross strands, as indicated in FIG. 6. In order to prevent melting, deformation or other heat damage to netting cross strands 6 by the high temperature of reinforcing strand segments 8A and 8B as the latter are pressed thereabout, it is preferred that the netting strands be formed of a plastic material having a higher melting point than the polyethylene of strand 8, such as polypropylene or polyester. It will be readily apparent however, that the method described is fully applicable when the netting sheet 2 is formed of wires rather than plastic strands, as is sometimes the case.

FIGS. 1-4 show an apparatus capable of performing the described method. In this apparatus, an extruder head 12 is provided with an internal cavity 14 to which the plastic mix is supplied under pressure, and in a hot, flowable consistency, and from which it is extruded by its pressure through a die orifice 16 having a cross-sectional contour corresponding to the desired contour of segment 8A of reinforcing strand 8. Wire 10 is directed through cavity 14 and orifice 16 by a tubular wire guide 11. Netting sheet 2 is moved to the lower surface of segment 8A just forwardly of orifice 16, through a tunnel 18 of the extruder head, and is held against segment 8A by the upper surface of a forwardly projecting finger 20 of the extruder head. Said finger is provided with an internal cavity 22 to which the hot, flowable plastic mix is also supplied under pressure, and from which said mix is extruded upwardly through an orifice 24 opening through the top surface of said finger, beneath sheet 2 and forwardly of orifice 16. Orifice 24 has a cross-sectional contour corresponding to that of strand segment 8B. Thus segment 8B is applied to the lower surface of segment 8A between cross strands 6 of netting sheet 2, and also passes under said cross strands.

Figure 1:
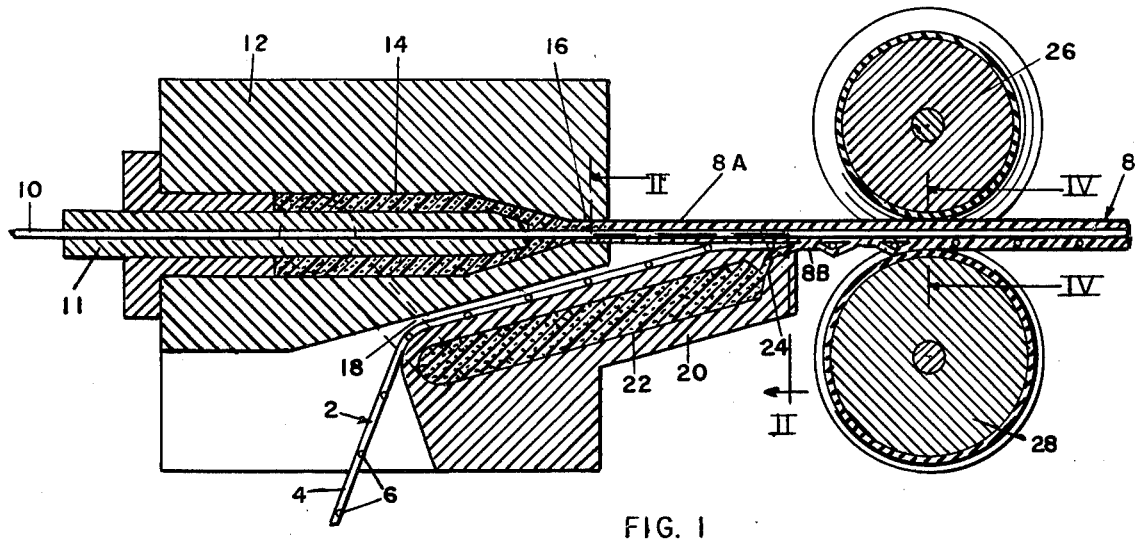
FIG. 1 is a longitudinal vertical sectional view of an apparatus capable of performing the preferred method of the present invention.
Figure 2:
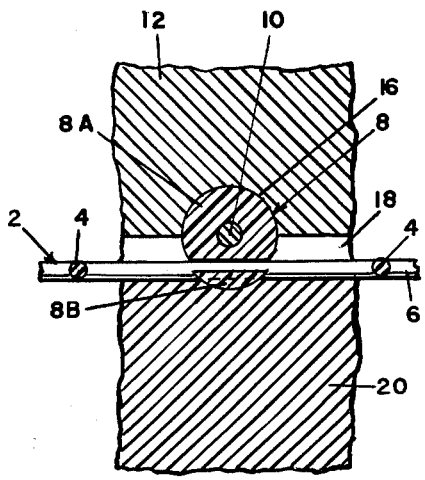
FIG. 2 is an enlarged, fragmentary sectional view taken on line II—II of FIG. 1.

Since strand segments 8A and 8B are still hot and semi-molten at this time, they readily fuse together when they are brought into contact with each other, so as to constitute the single reinforcing strand 8. However, the fusion connection may not be total and complete without the application of pressure thereto, and the plastic may not mold itself snugly about cross strands 6, but leave small openings adjacent the cross strands, as shown in FIG. 1 just forwardly of finger 20, and also in FIG. 3, so that the cross strands are not firmly bonded in strand 8. To correct these possible faults, the strand 8 is then passed between the peripheries of a pair of pressure forming rollers 26 and 28. The peripheries of these rollers are grooved to provide a generally circular orifice therebetween, divided in the same segmental proportions as strand segments 8A and 8B, and their peripheral portions are formed of a firm but yieldable material such as a firm rubber so that pressure may be applied thereby to strand 8, and so that they will yield to accomodate netting cross strands 6. These rollers therefore press strand segments 8A and 8B tightly together both to complete and insure the fusion bond therebetween, and also to mold the plastic tightly about cross strands 6. They also finally form strand 8 to its desired circular cross-sectional form. However, while the circular form is most commonly desired, other forms could be readily obtained if desired.

While we have shown and described specific methods embodying our invention, it will be readily apparent that many minor changes could be made without departing from the spirit of the invention.

What we claim as new and desire to protect by Letters Patent is:

1. A method of reinforcing a netted fabric sheet consisting of spaced apart longitudinal and cross strands connected at their points of intersection, said sheet being formed of a thermoplastic material having a relatively high melting point, said method comprising the successive steps of:
   a. extruding a stiffening strand of thermoplastic material in the form of a longitudinally divided separate segments, through a pair of suitable extrusion dies, the material of said strand having a relatively low melting point as compared to that of said netted fabric sheet,
   b. arranging said stiffening strand segments in closely adjacent relation to the respectively opposite sides of said netted sheet, intermediate and parallel to a pair of the longitudinal strands of said sheet and generally normally to the cross strands of said sheet, and
   c. fusing the segments of said stiffening strand together intermediate the cross strands of said sheet, while said segments are still hot and semi-molten following said extrusion step, whereby said segments form a unitary stiffening strand body through which said cross strands pass, said stiffening strand body not being bonded to said netted fabric sheet, thereby avoiding possible heat damage to the latter, due to the differential between their melting points.

2. A method as recited in claim 1 with the additional step of introducing a metallic core wire into at least one of said stiffening strand segments during said extrusion step, said core wire being completely enclosed in said segment, whereby said fabric cross strands pass through said stiffening strand in closely adjacent but non-intersecting relation to said core wire.

3. A method as recited in claim 1 with the additional step, following said initial fusion step but while the stiffening strand plastic is still semi-molten, of subjecting said strand to compressive pressure, whereby to further insure efficient fusion and to form said semi-molten plastic snugly about said fabric cross strands.

4. A method as recited in claim 3 wherein said compressive pressure is applied by means operable to impart a desired external cross-sectional contour to said stiffening strand.

* * * * *